United States Patent
Anthony

(10) Patent No.: US 6,309,456 B1
(45) Date of Patent: Oct. 30, 2001

(54) MULTI-COLOR ASPHALT EMULSION COATING

(75) Inventor: Brian James Anthony, Milford, OH (US)

(73) Assignee: The Brewer Company, Milford, OH (US)

( * ) Notice: Subject to any disclaimer, the term of this patent is extended or adjusted under 35 U.S.C. 154(b) by 0 days.

(21) Appl. No.: 09/514,029

(22) Filed: Feb. 25, 2000

(51) Int. Cl.⁷ .................................................. C09D 195/00
(52) U.S. Cl. .............................................. 106/277; 524/60
(58) Field of Search ................................. 106/277; 524/60

(56) References Cited

U.S. PATENT DOCUMENTS

| | | | |
|---|---|---|---|
| 3,567,476 | * 3/1971 | Masciantonio et al. | 106/277 |
| 3,950,283 | 4/1976 | Sellars et al. | 260/17 |
| 4,376,654 | 3/1983 | Zola | 106/163 |
| 5,114,484 | 5/1992 | Lynch | 106/170 |
| 5,114,485 | 5/1992 | Lynch et al. | 106/311 |
| 5,199,980 | 4/1993 | Lynch et al. | 106/311 |
| 5,314,535 | 5/1994 | Lynch et al. | 106/311 |
| 5,318,619 | 6/1994 | Lynch et al. | 106/311 |
| 5,340,389 | 8/1994 | Bollini | 106/197.2 |
| 5,437,719 | 8/1995 | Lynch et al. | 106/311 |
| 5,480,480 | 1/1996 | Lynch et al. | 106/311 |
| 5,616,635 | 4/1997 | Patel | 524/37 |
| 6,156,828 | * 12/2000 | Wickett | 524/60 |
| 6,245,850 | * 6/2001 | Fields | 524/445 |

* cited by examiner

*Primary Examiner*—David Brunsman
(74) *Attorney, Agent, or Firm*—Wood Herron & Evans, LLP

(57) ABSTRACT

A three component multi-color asphalt emulsion coating is provided in which a water-based carrier, an emulsified asphalt base and at least one globular color components are mixed together. The color components are prevented from mixing with the emulsified asphalt base by relative viscosity and colloidal strength of the color components. The resultant product has enhanced wear characteristics, and is easier and less expensive to apply than traditional roofing such as asphalt shingles. A process for forming the multi-color asphalt emulsion coating is provided wherein the water-based carrier, the emulsified asphalt base, and the globular color components are formed separately prior to first mixing the emulsified asphalt base with the water-based carrier and then blending as many prepared globular color components as desired.

85 Claims, No Drawings

MULTI-COLOR ASPHALT EMULSION COATING

FIELD OF THE INVENTION

This invention relates to coatings. More specifically, this invention relates to a wear resistant multi-color asphalt emulsion coating.

DESCRIPTION OF PRIOR ART

Asphalt roof shingles are the most common covering used on residential properties in North America. Asphalt shingles have been produced as early as the 1880's and used widely since early in the twentieth century for their low cost, ease of installation, fire-resistance, and a variety of colors and textures. Asphalt shingles are generally made from organic and predominantly fiberglass felts saturated with asphalt and covered with an granulated mineral surface, intended to last 20 to 30 years, with some lasting up to 40 years.

The expected life of a roof covering, such as asphalt shingles, depends on many variables, including type and quality of roofing materials selected, installation and workmanship details such as nailing errors, improper patterns of installation, and improper location. Wear and damage caused by weather, including rain, wind, hail, snow, ice and sunlight, gradually causes granules to erode and slough off, and edges to curl, indicating that the roof covering is reaching the end of its service life.

Apart from the elements listed above that can cause wear, the year-round climate in which the roofing material is installed has an effect on the expected life of the material. Higher thermal load, that is hotter climates, generally result in a shorter product life, whereas cooler climates allow the material to have a longer product life. In any climate, however, thermal splitting, or cracking, is one of the principle causes or roofing material damage. Thermal splitting, which is actually tearing of an asphalt shingle, has been found to occur in the lightest weight shingle and the most durable shingle product.

Asphalt roofing shingles are susceptible to other types of wear and damage such as granule loss, shingle cupping, shingle curling, organic growth such as algal and fungal growth, and the inevitable loss of shingles caused by wind blow-off when nails work loose.

Asphalt shingles are also susceptible to aesthetic or cosmetic roofing problems. Variations in manufacturing process can effect how a shingled roof looks from the ground. Of course, during the life of the product any of the above mentioned structural problems results in an asphalt shingle roof which becomes an eye sore.

Often, new layers of asphalt shingles are applied over old shingles in an attempt to save on the cost of removing the old shingles. This is generally a short term solution and may be done no more than twice until the built up roof must be entirely stripped of asphalt shingles and new asphalt shingles installed.

SUMMARY OF THE INVENTION

The present invention provides a multi-color asphalt emulsion coating and process for the preparation thereof for use as a coating over old existing asphalt shingle roofs and especially fiberglass based systems as well as any other surfaces, more specifically an emulsified asphalt base is mixed with a globular color component in a water-based carrier. The globular color component is prevented from mixing with the emulsified asphalt base by the relative viscosity and colloidal strength of the color component.

The emulsified asphalt base includes water as the dispersion medium, a slow setting asphalt as the disperse phase and a colloidal stabilizer to maintain the asphalt in suspension. The emulsified asphalt base also includes one or more wear resistant compositions.

The globular color component also uses water as a dispersion medium and a colloidal stabilizer to maintain a desired pigment in suspension. The globular color component may include wear resistant compositions and preservatives to lengthen the life of the product and prevent the multi-color asphalt emulsion coating from spoiling prior to and after application to a desired substrate.

The water-based carrier in which the emulsified asphalt base and globular color components are mixed includes an electrolyte to reduce the viscosity of a hectorite clay to allow for ease of application.

The inventive process for preparing the multi-color asphalt emulsion coating includes preparing separately the emulsified asphalt base, the globular color component and the water based carrier. As many globular color components are prepared as desired in order to achieve an acceptable multi-colored product. After each of the emulsified asphalt base, globular color component and water-based carrier are prepared, the emulsified asphalt base is first mixed with the water-based carrier in a ratio of about 1 part to about 2.25 parts, respectively. The globular color component is then blended with the emulsified asphalt base and water-based carrier at a desired ratio at relatively slow speeds to achieve a desired color globule size in the range of about 2 to about 5 millimeters.

In use, the multi-color asphalt emulsion coating may be applied to a desired substrate with either a high volume and low pressure texture sprayer or with a fringed rubber squeegee. Use of a texture sprayer or fringed rubber squeegee is preferred in order to prevent the color globules from streaking from use of excess force breaking the color globules during application. The multi-color asphalt emulsion coating is suitable for use on numerous surface, including but not limited to, asphalt shingles, asphalt rolled roofing, modified bitumen membrane, clay tile roofs, concrete and metal roofing.

The benefits derived from application of the multi-color asphalt emulsion coating upon any of the above-mentioned surfaces are far reaching. The wear composition included in the preparation of the emulsified asphalt base and the globular color component provides a product which, when cured upon a desired substrate, is impact resistant and resists damage caused by, for instance, hail and falling tree limbs. The cured product also has greater water resistance because it is a continuous coating, unlike granulated asphalt shingles of the prior art. The wear composition also provides resistance to degradation from ice and snow, whereby the cured product will not become brittle and break under freezing and other thermal splitting conditions since the wear composition provides a large degree of flexibility to the product, whereas prior art asphalt shingles will degrade, become brittle and crack under similar thermal splitting conditions.

Finally, the cost of use of the multi-color asphalt emulsion coating is substantially less than prior art asphalt shingles and other roofing products. Application of the present inventive multi-color asphalt emulsion coating would be about half the cost of re-roofing the same roof with asphalt shingles and have the cost-benefit expectation of a similar product life.

DETAILED DESCRIPTION OF THE PREFERRED EMBODIMENT

A multi-color asphalt emulsion coating has been devised in which three separate anionic water-based phases or parts are prepared and then mixed together to provide a multi-color asphalt emulsion coating product. The multi-color asphalt emulsion coating includes an emulsified asphalt base which provides compatibility with a desired substrate to which it is applied. Globular color components are prepared for as many different colors as desired, providing a variegated appearance which closely simulates the appearance of prior art granulated asphalt roofing shingles. The emulsified asphalt base and the globular color components are blended in a water-based carrier which facilitates application of the multi-color asphalt emulsion coating. The multi-color asphalt emulsion coating is described herein with reference to Tables 1, 2 and 3 included in the Example, below.

The emulsified asphalt base (Table 1) includes water as a carrier or dispersion medium in which a disperse phase is carried. The emulsified asphalt base includes about 5.0 to about 50.0% by weight of the dispersion medium. Preferably, the emulsified asphalt base includes about 10.0 to about 30.0% by weight of the dispersion medium and, most preferably about 20.0 to about 25.0% by weight of the dispersion medium.

The disperse phase of the emulsified asphalt base is an anionic or nonionic asphalt emulsion. This asphalt emulsion is of the slow setting type, i.e., it reverts to asphalt cement relatively slowly, through evaporation of the water carrier medium. Preferably, the asphalt emulsion is anionic. Various types of asphalts can be used in the preparation of the asphalt emulsion. The most preferred are those asphalts characterized by viscosity or penetration and are manufactured by steam refining or vacuum refining. However, oxidized asphalts, which are characterized by softening point and penetration, may also be advantageously used. The asphalt emulsion disperse phase is designed to provide the adhesion compatibility with the application substrate, as discussed further below. Upon curing, the asphalt emulsion retains its adhesion to the substrate very well and is resistant against damage and has inherent water resistant properties. The emulsified asphalt base includes about 10.0 to about 90.0% by weight of the asphalt emulsion. Preferably, the emulsified asphalt base is comprised of about 20.0 to about 60.0% by weight of the asphalt emulsion and, most preferably, about 40.0 to about 50.0% by weight of the asphalt emulsion. The asphalt emulsion used in the multi-color asphalt emulsion coating is available from Ashland-Marathon, LLC.

The emulsified asphalt base includes a colloidal stabilizer to lower the interfacial tension between the dispersion medium and the disperse phase and, thereby, surrounding the disperse phase to form a stable emulsion. The colloidal stabilizer maintains the asphalt disperse phase apart from a globular pigment disperse phase, as discussed further below. In a first embodiment, the colloidal stabilizer for the emulsified asphalt base is a hectorite clay, however, other suitable natural and synthetic clays may also be used to maintain separation of the water dispersion medium and the asphalt disperse phase. Preferably, the selected clay is a silicate with a particle size less than 10 microns. Other suitable clays include saponite, montmorillonite, smectite, bentonite, attapulgite or other inorganic minerals which are characterized by their affinity to separate into charged particles when dispersed in water and are capable of forming stable colloids. The colloidal stabilizer comprises about 0.1 to about 5.0% by weight of the emulsified asphalt base. Preferably, the emulsified asphalt base is comprised of about 0.2 to about 2.0% of the colloidal stabilizer and, most preferably, about 0.2 to about 0.4%. The hectorite clay used in the present inventive multi-color asphalt emulsion coating is available from Southern Clay Products under the trademark Laponite RD.

The emulsified asphalt base further includes a coalescing solvent which is absorbed by the asphalt, softening the disperse phase and allowing the emulsion to fuse as the asphalt cures. The emulsified asphalt base includes up to about 15.0% of the coalescing solvent. Preferably, the emulsified asphalt base includes about 1.0 to about 5.0% by weight of the coalescing solvent and, most preferably, about 1.0 to about 3.0% by weight of the coalescing solvent. The preferred coalescing solvent used in the present invention is an ester alcohol (2,2,4-tri-methyl-1,3-pentinediol monoisobutyrate) available from Eastman Kodak Company under the trademark Texanol. However, other suitable coalescing solvents such as aliphatic and/or aromatic hydrocarbon solvents and glycol ethers may also be used. The coalescing solvent softens the asphalt, assisting in proper film formation during curing.

A hydroxyethyl cellulose thickener may be added to the emulsified asphalt base to thicken the dispersion medium. The emulsified asphalt base includes up to about 2.0% by weight of the thickener. Preferably, the emulsified asphalt base includes about 0.2 to about 1.0% by weight of the thickener and, most preferably, about 0.2 to about 0.4% by weight of the thickener. The hydroxyethyl cellulose thickener preferably used in the multi-colored asphalt emulsion is available from Aqualon Division, Hercules Inc. under the trademark Natrosol. However, other suitable thickeners may also be used, such as other hydroxy (lower alkyl) cellulosic thickeners and polyurethane associative thickeners.

The colloidal stabilizer and the thickener provide colloidal stability and thixotropy required to maintain separation of pigment globules, discussed below. If the colloidal stabilizer is not incorporated into the multi-color asphalt emulsion coating, the globular disperse phase eventually blend/bleed together, despite the variation in component viscosities. The thickener has a synergistic effect with the colloidal stabilizer, maximizing the colloidal gel strength.

The emulsified asphalt base includes an extender to increase the level of solids and reduce the tackiness of the multi-color asphalt emulsion coating product, Extenders which add bulk and lower product cost are generally known in the coating industry. The emulsified asphalt base includes about 5.0 to about 60.0% by weight of the extender. Preferably, the emulsified asphalt base includes about 10.0 to about 40.0% by weight of the extender and, most preferably, about 30.0 to about 40.0% by weight of the extender. The multi-color asphalt emulsion coating preferably uses Atomite, which is a calcium carbonate extender, available from ECC America Incorporated. However, other suitable extenders such as kaolinite, slate flour, talc, mica and baryte may also be advantageously used. The extender is designed to extend the asphalt, reduce cost of the product and to prevent excess tackiness.

In order to enhance the dispersion of the dry components of the emulsified asphalt base, a dispersant is included. The dispersant assists in the dispersion and wetting of the dry ingredients, including the extender and desired pigment. It is important to maintain stability of the multi-color asphalt emulsion coating once packaged, reducing the tendency to seed or gel.

The preferred dispersant, a polycarboxylic acid salt is available from Rohm and Haas under the trademark Tamol 731. The emulsified asphalt base includes up to about 2.0% by weight of the dispersant. Preferably the emulsified asphalt base includes about 0.2 to about 1.0% of the dispersant and, most preferably, about 0.5 to about 0.8% by weight of the dispersant.

In order to enhance the wetting of the substrate and to reduce the interfacial surface tension between the substrate and the multi-color asphalt emulsion coating during application, a wetting agent is included. The wetting agent reduces the interfacial tension between the substrate and the applied multi-color asphalt emulsion coating. The wetting agent is important to ensure satisfactory coverage, wetting of the substrate, and adhesion of the multi-color asphalt emulsion coating to the surface to which it is applied. The wetting agent preferably used in the emulsified asphalt base is a modified alkylaryl polyether and is available from Union Carbide Corp. under the trademark Triton CF-10. The emulsified asphalt base includes up to about 2.0% by weight of the wetting agent. Preferably, the emulsified asphalt base includes about 0.1 to about 1.0% by weight of the wetting agent, and most preferably, about 0.1 to about 0.3% of the wetting agent. While the multi-color asphalt emulsion coating preferably uses Tamol 731 and Triton CF-10 as a dispersant and wetting agent, respectively, other suitable dispersants such as sodium acid salts and polycarboxylic acid salts may be advantageously used, and other suitable wetting agents such as alkylaryl polyethers may be advantageously used.

The emulsified asphalt base includes a wear resistant composition to enhance the product life of the cured multi-color asphalt emulsion coating as applied to a desired substrate. For example, if the multi-color asphalt emulsion coating is applied to asphalt roofing shingles, the cured multi-color asphalt emulsion coating must be able to withstand various environmental insults such as, all forms of precipitation, limbs falling from trees, thermal shock from rapidly falling or rapidly increasing temperatures, etc. The preferred wear resistant composition added to the emulsified asphalt base is a styrene-acrylic latex available from Scott Bader, Inc. under the trademark Texigel. However, other suitable wear resistant latex compositions such as, acrylic, acrylonitrile-butadiene, ethylene-vinyl-acetate, vinyl acrylic, vinyl chloride, vinylidene and polidene may be advantageously used. The emulsified asphalt base includes about up to about 20.0% by weight of the wear resistant composition. Preferably, the emulsified asphalt base includes about 2.0 to about 10.0% of the wear resistant composition and, most preferably, about 3.0 to about 5.0% by weight of the wear resistant composition. The wear resistant composition imparts flexibility and enhanced weathering resistance to the cured multi-color asphalt emulsion coating.

The emulsified asphalt base may include various preservatives known in the art in order to resist fungal, algal, bacterial, or other biological growth which would degrade the multi-color asphalt emulsion coating product when it is shipped or stored for sale in suitable packaging and also protect the multi-color asphalt emulsion coating after application to a substrate and during its product life. The emulsified asphalt base includes a bactericide available from Troy Corporation, under the trademark Troysan 174. The Troysan 174 is an in-can preservative or bactericide. It prevents the growth of bacteria while the coating is stored in the packaging container. The emulsified asphalt base includes up to about 2.0% by weight of the bactericide. Preferably, the emulsified asphalt base includes about 0.2 to about 1.0 by weight of the bactericide and, most preferably, about 0.2 to about 0.5% by weight of the bactericide.

The emulsified asphalt base may include a fungicide available from Troy Corporation under the trademark Troysan Polyphase 588. The Troysan Polyphase 588 provides resistance to mold, algae, mildew and fungus growth in the cured multi-color coating, upon exposure to the elements. The emulsified asphalt base includes up to about 2.0% by weight of the fungicide. Preferably, the emulsified asphalt base includes about 0.2 to about 1.0% by weight of the fungicide and, most preferably, about 0.2 to about 0.5% by weight of the fungicide. Any other suitable bactericide or fungicide known in the art may be advantageously used in the emulsified asphalt base.

The emulsified asphalt base preferably includes a defoamer to prevent the emulsified asphalt base from foaming as the ingredients of the emulsified asphalt base are blended together, as further discussed below. The emulsified asphalt base includes up to about 2.0% by weight of the defoamer. Preferably, the emulsified asphalt base includes about 0.1 to about 1.0% by weight of the defoamer and, most preferably, about 0.1 to about 0.3% by weight of the defoamer. While any suitable defoamer may be used in the emulsified asphalt base, the present inventive multi-color asphalt emulsion coating advantageously uses Drew L-475 available from Drew Industrial Division of Ashland Specialty Chemical Company The defoamer is used to reduce the level of air entrained in the coating during the process of manufacture, discussed below.

The preferred viscosity of the emulsified asphalt base is about 5000 to about 10,000 cps at 77° F., Brookfield RVT, #4 spindle at 20 RPM.

The globular color component (Table 2) of the multi-color asphalt emulsion coating includes many of the same components included in the emulsified asphalt base. However, the globular color component does not include the asphalt emulsion.

The globular color component includes water as the dispersion medium in which a pigment is added as the disperse phase, as discussed further below. The globular color component includes about 5.0 to about 50.0% by weight of water. Preferably, the globular color component includes about 10.0 to about 30.0% by weight of water and, most preferably, about 10.0 to about 15.0% by weight of water.

The globular color component includes, as the disperse phase, a pigment to color the multi-color asphalt emulsion coating. As seen in the Example below, one particularly preferred color is Green V-12600 available from Ferro Corporation. However, other mixed metal oxide pigments may be used, such as, Brown PC-9143 and Brown PC-10109, both available from Ferro Corporation, and Permablak 115A available from Monochem Incorporated. Titanium dioxide ($TiO_2$) may be advantageously used as white pigment in the globular color component. The present invention can include various pigments known in the art. The pigment should be less than 5 microns in size, substantially insoluble in water and not contribute any positive electrolyte charge. It can be organic, inorganic or a mixture thereof. The globular color component includes up to about 10.0% by weight of the desired pigment. Preferably, the globular color component includes about 3.0 to about 8.0% by weight of the pigment and, most preferably, about 4.0 to about 6.0% by weight of the pigment.

The pigment disperse phase is surrounded by the colloidal stabilizer, discussed further below, to form color globules which preferably have a diameter in the range of about 3 to about 7 millimeters. Preferably, the viscosity of the globular color component should be a minimum of about 6 times, preferably about 6 to about 8 times, higher in viscosity than the water-based carrier, described above, in order to achieve the preferred color globule size.

The colloidal stabilizer included in the globular color component is of the same type included in the emulsified asphalt base. That is, hectorite clay, or any other suitable colloidal stabilizer, may be used to surround the pigment disperse phase in the water dispersion medium to form color globules. The globular color component includes about 0.1 to about 5.0% by weight of the colloidal stabilizer. Preferably, the globular color component includes about 0.1 to about 1.0% by weight of the colloidal stabilizer and, most preferably, about 0.3 to about 0.6% by weight of the colloidal stabilizer.

The globular color component includes a coalescing solvent as described above and included in the emulsified asphalt base. The coalescing solvent added to the globular color component is absorbed by the wear resistant composition, discussed below, softening the disperse phase and causing fusion as the multi-color asphalt emulsion coating cures when applied to a desired substrate. The globular color component includes up to about 15.0% by weight of the coalescing solvent. Preferably, the globular color component includes about 1.0 to about 5.0% by weight of the coalescing solvent and, most preferably, about 1.0 to about 3.0% by weight of the coalescing solvent.

The globular color component also includes a thickener as described above and included in the emulsified asphalt base, for substantially the same function. Preferably, the globular color component includes about 0.1 to about 2.0% by weight of the thickener. Preferably, the globular color component includes about 0.1 to about 1.0% by weight of the thickener and, most preferably, about 0.3 to about 0.6% by weight of the thickener.

The globular color component also includes a wear resistant composition as described above and included in the emulsified asphalt base, for substantially the same purpose. However, in addition to the styrene acrylic latex described above, the globular color component wear resistant composition also includes a refined vulcanized rubber powder to add additional weather and impact resistance to the cured multi-color asphalt emulsion coating. The wear resistant composition included in the globular color component includes about 10.0 to about 60.0% by weight of the styrene acrylic latex. The globular color component wear resistant composition preferably includes about 10.0 to about 45.0% by weight of the styrene acrylic latex and, most preferably about 30.0 to about 40.0% by weight of the styrene acrylic latex. The styrene acrylic latex binds the extender and pigment together in the cured multi-color asphalt emulsion coating product.

The globular color component includes up to about 5.0% by weight of the refined vulcanized rubber powder. Preferably, the globular color component includes about 1.0 to about 4.0% by weight of the refined vulcanized rubber powder and, most preferably, about 1.5 to about 3.0% by weight of the refined vulcanized rubber powder. The preferred refined vulcanized rubber powder included in the wear resistant composition of the globular color component is available from Rause Rubber Industries, Inc. under the trademark GF-170, however, any other suitable refined vulcanized rubber powder may be advantageously used having a preferred particle size of 90 microns or less.

The globular color component also includes an extender as previously described which is included in the emulsified asphalt base for extending the wear resistant composition to reduce cost and to prevent excess tackiness. The globular color component includes up to about 60.0% by weight of the extender. Preferably, the globular color component includes about 10.0 to about 50.0% by weight of the extender and, most preferably, about 40.0 to about 50.0% by weight of the extender.

The globular color component also includes a wetting agent and a dispersant as described above and included in the emulsified asphalt base for substantially the same function. The globular color component includes up to about 2.0% by weight of the wetting agent. The globular color component includes about 0.1 to about 1.0% by weight of the wetting agent and, most preferably, about 0.2 to about 0.6% by weight of the wetting agent. The globular color component includes up to about 2.0% by weight of the dispersant. Preferably, the globular color component includes about 0.1 to about 1.0% by weight of the dispersant and, most preferably, about 0.2 to about 0.8% by weight of the dispersant.

The globular color component includes a defoamer as previously. The globular color component includes up to about 2.0% by weight of the defoamer. Preferably, the globular color component includes about 0.1 to about 1.0% by weight of the defoamer and, most preferably, about 0.1 to about 0.5% by weight of the defoamer.

The globular color component includes preservatives such as the fungicide and the bactericide described above and included in the emulsified asphalt base. The globular color component includes up to about 2.0% by weight of the fungicide. Preferably, the globular color component includes about 0.1 to about 1.0% by weight of the fungicide and, most preferably, about 0.2 to about 0.8% by weight of the fungicide.

The globular color component includes up to about 2.0% by weight of the bactericide. Preferably, the globular color component includes about 0.1 to about 1.0% by weight of the bactericide and, most preferably, about 0.1 to about 0.5% by weight of the bactericide.

The preferred viscosity of the globular color component is about 40,000 to about 80,000 cps at 77° F., Brookfield RVT, #6 spindle at 20 RPM.

A water-based carrier (Table 3) is included in the multi-color asphalt emulsion coating in order to facilitate the blending of the emulsified asphalt base and the globular color component. The water-based carrier also provides a carrier medium in which the emulsified asphalt and globular color component may be thinned so as to facilitate application of the multi-color asphalt emulsion coating on the desired substrate.

The water-based carrier includes about 87.0 to about 97.0% by weight of water. Preferably, the water-based carrier includes about 90.0 to about 97.0% by weight of water and, most preferably, about 96.0 to about 97.0% by weight of water.

The water-based carrier also includes a hectorite clay as used in the emulsified asphalt base and globular color component. In the water-based carrier, the hectorite clay forms a highly thixotrophic gel which, when dispersed in water, maintains the color globule separation. Any other suitable clays may be advantageously used. The water-based carrier includes about 3.0 to about 10.0% by weight of the hectorite clay. Preferably, the water-based carrier includes about 3.0 to about 7.0% by weight of the hectorite clay and, most preferably, about 3.0 to about 4.0% by weight of the hectorite clay.

The water-based carrier includes an electrolyte to reduce the viscosity of the hectorite clay to allow for reduced hydration of the hectorite clay in the water. The electrolyte is a water soluble peptizing agent that induces the hectorite clay to form a stable colloidal aqueous dispersion. The water-based carrier preferably uses tetrasodium pyrophosphate as the electrolyte, available from FMC Corporation. Examples of other suitable water soluble peptizing agents include ammonium hydroxide, hydrogen peroxide, sodium carbonate, sodium citrate, sodium hydroxide, sodium oxalate, sodium silicate, sodium tripolyphosphate, sodium hexametaphosphate, tetrasodium pyrophosphate, and the like. The water-based carrier includes up to about 3.0% by weight of the electrolyte. Preferably, the water-based carrier includes up to about 2.1 % by weight of the electrolyte and, most preferably, up to about 0.8% by weight of the electrolyte.

The preferred viscosity of the water-based carrier is about 1,000 to about 5,000 cps at 77° F., Brookfield RVT, #4 spindle at 20 RPM.

Because colloidal strength is a function of viscosity, particle size and ion exchange capacity of the colloidal stabilizer, wherein a greater ion exchange capacity forms a stronger gel, colloidal strength may be adjusted by varying the type and particle size of the colloidal stabilizer.

A process is provided for the formation of the multi-color asphalt emulsion coating and is described with reference to the Example provided below. The inventive process for the formation of the multi-color asphalt emulsion coating contemplates that the emulsified asphalt base, the globular color component, and the water-based carrier are each prepared separately before mixing to form the multi-color asphalt emulsion coating product for application to a desired substrate. The preparation of each of the emulsified asphalt base, globular color component and water-based carrier, and their subsequent mixing is carried out at about 77° F. to about 120° F. at atmospheric pressure.

The emulsified asphalt base is prepared by mixing first components together, including the water, asphalt, Laponite RD and Natrosol. These first components are mixed at about 1800 to about 3600 RPM for about 20 minutes. Next, second components of the emulsified asphalt base, including Tamol 731, Triton CF-10, and Drew L-745 are mixed together with the first components at about the same speed for about 5 to about 10 minutes. Third components of the emulsified asphalt base including Atomite, Texanol and Texigel 17-0328 are then added to the first and second components and mixed at about the same speed for about 15 minutes. Additional components including the Troysan Polyphase 588 and the Troysan 174 are added after the third emulsified asphalt base components at about 1800 to about 3600 RPM for about 5 minutes.

The process for preparing the globular color composition mixes first components including water, Laponite RD and Natrosol at about 1800 to about 3000 RPM for about 20 minutes. Next, second components of the globular color composition including, Tamol 731, Triton CF-10 and Drew L-745 are mixed with the first components of the globular color composition about the same speed for about 20 minutes. Next, the desired pigment is mixed with the first and second components at about the same speed for an additional 20 minutes. Texigel 17-0328 and GF-170 are then mixed at a reduced speed of about 1800 to about 3600 RPM for 20 minutes. The Texanol is then mixed into the globular color composition at about 1800 to about 3600 RPM for about 15 to about 20 minutes. Troysan Polyphase 588 and Troysan 174 are thereafter mixed with the globular color composition at about 1800 to about 3600 RPM for about 5 minutes.

The water-based carrier is formed by mixing first components including water and the Laponite RD at about 60 to about 500 RPM for about 20–30 minutes. Then, the tetrasodium pyrophosphate is mixed with the first components at about 60 to about 500 RPM for about 10 minutes.

Having formed each of the emulsified asphalt base, globular color component and water-based carrier, these three phases of the multi-color asphalt emulsion coating are then mixed together separately. First, the emulsified asphalt base and the water-based carrier are blended together at a speed of about 20 to about 60 RPM for about 5 minutes. The emulsified asphalt base and water-based carrier are blended together in a ratio of about 1:1 to about 1:4, preferably about 1:1 to about 1:3 and, most preferably, about 1:2.25. Next, for as many globular color components as desired, the globular color component are all added together to the emulsified asphalt base and water-based carrier while mixing is stopped. After the globular color components are added to the emulsified asphalt base and water-based carrier in the desired ratio to produce a multi-color asphalt emulsion coating with the desired aesthetic characteristics, mixing is resumed at a speed of about 20 to about 60 RPM to ensure that the color globules are not destroyed during mixing and so they may maintain their viscosity and colloidal strength variation with the emulsified asphalt base. The globular color component is mixed with the emulsified asphalt base and water-based carrier for about 2 to about 5 minutes producing a multi-color asphalt emulsion coating with as many different globular color components included as desired.

Preferred embodiments of the emulsified asphalt base, globule color component and water-based carrier for the multi-color asphalt emulsion coating is described below in Tables 1, 2 and 3 which, when prepared by the process above, form a multi-color asphalt emulsion coating with a green and black tint.

TABLE 1

EMULSIFIED ASPHALT BASE

| | POUNDS | % BY WEIGHT |
|---|---|---|
| Water | 20.71 | 20.71% |
| Laponite RD | 0.21 | 0.21% |
| Natrosol | 0.21 | 0.21% |
| Tamol 731 | 0.67 | 0.67% |
| Triton CF-10 | 0.15 | 0.15% |
| Drew L-475 Defoamer | 0.15 | 0.15% |
| Troysan Polyphase 588 | 0.20 | 0.20% |
| Troysan 174 | 0.20 | 0.20% |
| Atomite-Calcium Carbonate | 31.10 | 31.10% |
| SS1h | 42.00 | 42.00% |
| Texigel 17-0328 | 3.00 | 3.00% |
| Texanol | 1.40 | 1.40% |
| | 100.00 | 100.00% |

TABLE 2

GLOBULAR COLOR COMPONENT

| | POUNDS | % BY WEIGHT |
|---|---|---|
| Water | 12.62 | 12.62% |
| Laponite RD | 0.49 | 0.49% |
| Natrosol | 0.53 | 0.53% |
| Tamol 731 | 0.73 | 0.73% |
| Triton CF-10 | 0.21 | 0.21% |
| Drew L-475 Defoamer | 0.20 | 0.20% |
| Troysan Polyphase 588 | 0.73 | 0.73% |
| Troysan 174 | 0.19 | 0.19% |
| $TiO_2$ | 0.80 | 0.80% |

TABLE 2-continued

GLOBULAR COLOR COMPONENT

|  | POUNDS | % BY WEIGHT |
| --- | --- | --- |
| Green Ferro V-12600 | 3.20 | 3.20% |
| GF-170 | 1.94 | 1.94% |
| Atomite-Calcium Carbonate | 40.34 | 40.34% |
| Texigel 17-0328 | 36.56 | 36.56% |
| Texanol | 1.46 | 1.46% |
|  | 100.00 | 100.00% |

TABLE 3

WATER-BASED CARRIER

|  | POUNDS | % BY WEIGHT |
| --- | --- | --- |
| Water | 96.48 | 96.48% |
| Laponite RD | 3.50 | 3.50% |
| Tetrasodium pyrophosphate | 0.02 | 0.02% |
|  | 100.00 | 100.00% |

In use, the multi-color asphalt emulsion coating is advantageously applied with a high volume/low pressure texture spray or a fringed rubber squeegee in order to maintain the integrity of the color globules without streaking so as to produce a coated substrate which can very closely simulate the appearance of granulated asphalt roofing shingles. The fringed rubber squeegee is simply a rubber squeegee that has been modified with cuts to provide fingers to prevent the color globules from streaking during application. Using a stiff bristled broom or a portable leaf blower, all loose surface debris such as leaves, twigs, pine needles, un-adhered granules, and other surface contaminants should be removed prior to application of the multi-color asphalt emulsion coating. Algae, fungus, mold and mildew infected surfaces must be cleaned and sterilized with a dilute solution of sodium hypochlorite or other commercially available cleaner designed to eliminate algae, mold, fungus and mildew. The surface should be primed with a thin, elastomeric asphalt emulsion known in the art.

The multi-color asphalt emulsion coating may be applied to a wide variety of substrates, including asphalt shingles, asphalt rolled roofing, modified bitumen membranes, clay tile roofs, concrete and metal roofing. When applied to a desired substrate intended to be used as roofing material, the multi-color asphalt emulsion coating takes on the appearance of granular asphalt roofing shingles, as mentioned, however, the multi-colored asphalt emulsion coating, when cured, is more resistant to degradation caused by impacts from, for example, hail and failing tree limbs. The cured coating also has greater water resistant properties, is more resistant to damage caused by rapid change in temperature, is more resistant to damage caused from freezing temperatures and damage caused by other environmental influences such as heat from the sun and buffeting from the wind.

From the above disclosure of the detailed description of the present invention and the preceding summary of the preferred embodiment, those skilled in the art will comprehend the various modifications to which the present invention is susceptible. Therefore, I desire to be limited only by the scope of the following claims and equivalents thereof.

I claim:

1. A multi-colored coating, including:
a water-based carrier;
an emulsified asphalt base; and
at least one globular color component, wherein said color component has a viscosity and colloidal strength effective to prevent it from mixing with said emulsified asphalt base.

2. The coating of claim 1, wherein said emulsified asphalt base comprises water, a colloidal stabilizer, a thickener, a wetting agent, a dispersant, asphalt, at least one wear resistant composition, and a coalescing solvent.

3. The coating of claim 2, wherein said emulsified asphalt base is comprised of about 5.0 to about 50.0% by weight of said water.

4. The coating of claim 3, wherein said emulsified asphalt base is comprised of about 20.0 to about 25.0% by weight of said water.

5. The coating of claim 2, wherein said colloidal stabilizer is selected from the group consisting of saponite, montmorillonite, smectite, bentonite, or attapulgite.

6. The coating of claim 5, wherein said emulsified asphalt base is comprised of about 0.1 to about 5.0% by weight of said colloidal stabilizer.

7. The coating of claim 5, wherein said emulsified asphalt base is comprised of about 0.2 to about 0.4% by weight of said colloidal stabilizer.

8. The coating of claim 2, wherein said thickener is selected from the group consisting of hydroxy(lower alkyl) cellulosic thickeners, or polyurethane associative thickeners.

9. The coating of claim 8, wherein said emulsified asphalt base is comprised of up to about 2.0% by weight of said thickener.

10. The coating of claim 8, wherein said emulsified asphalt base is comprised of about 0.2 to about 0.4% by weight of said thickener.

11. The coating of claim 2, wherein said wetting agent is an alkylaryl polyether.

12. The coating of claim 11, wherein said emulsified asphalt base is comprised of up to about 2.0% by weight of said wetting agent.

13. The coating of claim 11, wherein said emulsified asphalt base is comprised of about 0.5 to about 0.8% by weight of said wetting agent.

14. The coating of claim 11, wherein said emulsified asphalt base is comprised of about 10.0 to about 90.0% by weight of said asphalt.

15. The coating of claim 11, wherein said emulsified asphalt base is comprised of about 40.0 to about 50.0% by weight of said asphalt.

16. The coating of claim 2, wherein said wear resistant composition is selected from the group consisting of a styrene acrylic latex, acrylic latex, acrylonitrile-butadine latex, ethylene-vinyl-acetate latex, vinyl acrylic latex, vinyl chloride latex, vinylidene latex and polidene latex.

17. The coating of claim 2, wherein said emulsified asphalt base is comprised of up to about 20.0% by weight of said wear resistant composition.

18. The coating of claim 2, wherein said emulsified asphalt base is comprised of about 3.0 to about 5.0% by weight of said wear resistant composition.

19. The coating of claim 2, wherein said coalescing solvent is selected from the group consisting of an aliphatic hydrocarbon solvent, an aromatic hydrocarbon solvent, a glycol ether, and an ester alcohol.

20. The coating of claim 19, wherein said emulsified asphalt base is comprised of up to about 15.0% by weight of said coalescing solvent.

21. The coating of claim 19, wherein said emulsified asphalt base is comprised of about 1.0 to about 3.0% by weight of said coalescing solvent.

22. The coating of claim 2, wherein said dispersant is selected from the group consisting of a polycarboxylic acid salt or a sodium acid salt.

23. The coating of claim 2, wherein said emulsified asphalt base is comprised of up to about 2.0% by weight of said dispersant.

24. The coating of claim 2, wherein said emulsified asphalt base is comprised of about 0.2 to about 0.4% by weight of said dispersant.

25. The multi-colored coating of claim 1, comprising a plurality of discrete globular color components.

26. The coating of claim 1, wherein said globular color component is comprised of water, a colloidal stabilizer, a thickener, a wetting agent, a dispersant, a pigment, a wear resistant composition, and a coalescing solvent.

27. The coating of claim 26, wherein said color component is comprised of about 5.0 to about 50.0% by weight of water.

28. The coating of claim 26, wherein said color component is comprised of about 10.0 to about 15.0% by weight of water.

29. The coating of claim 26, wherein said colloidal stabilizer is selected from the group consisting of hectorite clay, saponite, montmorillonite, smectite, bentonite, or attapulgite.

30. The coating of claim 29, wherein said color component is comprised of about 0.3 to about 0.6% by weight of said colloidal stabilizer.

31. The coating of claim 29, wherein said thickener is selected from the group consisting of, hydroxy(lower alkyl) cellulosic thickeners, or polyurethane associative thickeners.

32. The coating of claim 31, wherein said color component is comprised of about 0.1 to about 2.0% by weight of said thickener.

33. The coating of claim 31, wherein said color component is comprised of about 0.3 to about 0.6% by weight of said thickener.

34. The coating of claim 26, wherein said color component is comprised of about 0.1 to about 5.0% by weight of said colloidal stabilizer.

35. The coating of claim 26, wherein said wetting agent is an alkylaryl polyether.

36. The coating of claim 35, wherein said color component is comprised of up to about 2.0% by weight of said wetting agent.

37. The coating of claim 35, wherein said color component is comprised of about 0.2 to about 0.6% by weight of said wetting agent.

38. The coating of claim 26, wherein said color component is comprised of up to about 10.0% by weight of said pigment.

39. The coating of claim 26, wherein said color component is comprised of about 4.0 to about 6.0% by weight of said pigment.

40. The coating of claim 26, wherein said wear resistant composition is selected from the group consisting of a styrene acrylic latex, acrylic latex, acrylonitrile-butadine latex, ethylene-vinyl-acetate latex, vinyl acrylic latex, vinyl chloride latex, vinylidene latex and polidene latex.

41. The coating of claim 40, wherein said color component is comprised of about 10.0 to about 60.0% by weight of said wear resistant composition.

42. The coating of claim 40, wherein said color component is comprised of about 30.0 to about 40.0% by weight of said wear resistant composition.

43. The coating of claim 26, wherein said wear resistant composition is a vulcanized ground rubber.

44. The coating of claim 43, wherein said color component is comprised of up to about 5% by weight of said vulcanized ground rubber.

45. The coating of claim 43, wherein said color component is comprised of about 1.5 to about 3.0% by weight of said vulcanized ground rubber.

46. The coating of claim 26, wherein said dispersant is selected from the group consisting of a polycarboxylic acid salt or a sodium acid salt.

47. The coating of claim 46, wherein said color component is comprised of up to about 2.0% by weight of said dispersant.

48. The coating of claim 46, wherein said color component is comprised of about 0.2 to about 0.8% by weight of said dispersant.

49. The coating of claim 26, wherein said coalescing solvent is selected from the group consisting of an aliphatic hydrocarbon solvent, an aromatic hydrocarbon solvent, a glycol ether, and an ester alcohol.

50. The coating of claim 49, wherein said color component is comprised of up to about 15.0% by weight of said coalescing solvent.

51. The coating of claim 49, wherein said color component is comprised of about 1.0 to about 3.0% by weight of said coalescing solvent.

52. The coating of claim 1, wherein said water based carrier is comprised of water, a clay, and an electrolyte.

53. The coating of claim 52, wherein said water based carrier is comprised of about 87.0 to about 97.0% by weight of said water.

54. The coating of claim 52, wherein said water based carrier is comprised of about 96.0 to about 97.0% by weight of said water.

55. The coating of claim 52, wherein said clay is selected from the group consisting of saponite, montmorillonite, smectite, bentonite, or attapulgite.

56. The coating of claim 55, wherein said water based carrier is comprised of about 3.0 to about 4.0% by weight of said clay.

57. The coating of claim 52, wherein said water based carrier is comprised of about 3.0 to about 10.0% by weight of said clay.

58. The coating of claim 52, wherein said electrolyte is a water soluble peptizing agent.

59. The coating of claim 58, wherein said water based carrier is comprised of up to about 3.0% by weight of said electrolyte.

60. The coating of claim 58, wherein said water based carrier is comprised of up to about 0.8% by weight of said electrolyte.

61. The coating of claim 52, wherein said electrolyte is tetrasodium pyrophosphate.

62. A process of forming a multi-color coating from an emulsified asphalt base having a viscosity and colloidal strength, a color component having a colloidal strength and viscosity, and a water-based carrier, said process comprising the steps of:

blending said emulsified asphalt base with said water-based carrier; and mixing said color component with said blended asphalt base and carrier composition, wherein the relative viscosities and colloidal strengths of said emulsified asphalt base and said color component are effective to maintain said color component as discrete globules dispersed in said asphalt emulsion.

63. The process of claim 62, wherein said emulsified asphalt base is formed by a process comprising the steps of:

mixing first components including asphalt, water, a colloidal stabilizer, and a thickener composition;

mixing second components including a wetting agent and a dispersant with said first components; and mixing third components including a coalescing solvent and a wear composition with said first and second components.

64. The process of claim 63, further comprising the step of:

mixing said first, second and third components of said emulsified asphalt base at a speed in the range of about 1800 to about 3600 RPM.

65. The process of claim 63, further comprising the step of:

mixing together said first components of said emulsified asphalt base for about 20 minutes.

66. The process of claim 63, further comprising the step of:

mixing said second components with said first components for about 5 to about 10 minutes.

67. The process of claim 63, further comprising the step of:

mixing said third components with said first and second mixing components for about 15 minutes.

68. The process of claim 62, wherein said color composition is formed by a process comprising the steps of:

mixing first components including water, a colloidal stabilizer and a thickener composition;

mixing second components including a wetting agent and a dispersant with said first components;

mixing a pigment with said first and second components;

mixing a wear composition with said first and second components, and said colorant; and mixing a coalescing solvent with said first and second components, said colorant, and said wear composition.

69. The process of claim 68, further comprising the step of:

mixing said first and second components and said colorant together at a speed in the range of about 1800 to about 3600 RPM.

70. The process of claim 68, further comprising the step of:

mixing said wear composition and said coalescing solvent together at a speed in the range of about 1800 to about 3600 RPM.

71. The process of claim 68, further comprising the step of mixing said first components together for about 20 minutes.

72. The process of claim 68, further comprising the step of mixing said second components with said first components for about 20 minutes.

73. The process of claim 68, further comprising the step of mixing said colorant with said first and second components for about 20 minutes.

74. The process of claim 68, further comprising the step of mixing said wear composition with said first and second components and said colorant for about 20 minutes.

75. The process of claim 68, further comprising the step of mixing said coalescing solvent with said first and second components, said colorant, and said wear composition for about 15 to about 20 minutes.

76. The process of claim 62, wherein said water based carrier is formed by a process comprising the steps of:

mixing first components including water and a colloidal stabilizer; and mixing an electrolyte with said first components.

77. The process of claim 76, further comprising the step of mixing said first components together at a speed in the range of about 60 to about 500 RPM.

78. The process of claim 76, further comprising the step of mixing said hectorite clay with said first components at a speed in the range of about 60 to about 500 RPM.

79. The process of claim 76, further comprising the step of mixing said first components together for about 20–30 minutes.

80. The process of claim 76, further comprising the step of mixing said hectorite with said first components for about 10 minutes.

81. The process of claim 62, further comprising the steps of:

blending said emulsified asphalt base with said water based carrier at a speed of about 20 to about 60 RPM for about 5 minutes; and mixing said color component with said emulsified asphalt base and said water based carrier at speed of about 20 to about 60 RPM for about 2 to about 5 minutes.

82. A multi-color coating, comprising:

a water-based carrier including water, a clay, and an electrolyte;

an emulsified asphalt base, including water, a colloidal stabilizer, a thickener, a wetting agent, a dispersant, asphalt, at least one wear resistant composition, and a coalescing solvent; and at least one globular color component, including water, a colloidal stabilizer, a thickener, a wetting agent, a dispersant, a pigment, a wear resistant composition, and a coalescing solvent, wherein said color component has a viscosity and colloidal strength effective to prevent it from mixing with said emulsified asphalt base.

83. The multi-color coating of claim 82 comprising a plurality of discrete globular color components.

84. A process of forming a multi-color coating from an emulsified asphalt base having a viscosity and colloidal strength, a color component having a colloidal strength and viscosity, and a water-based carrier, said process comprising the steps of:

blending said emulsified asphalt base with said water-based carrier at a speed of about 20 to about 60 RPM for about 5 minutes; and mixing said color component with said emulsified asphalt base and said water-based carrier at a speed of about 20 to about 60 RPM for about 2 to about 5 minutes, wherein the relative viscosities and colloidal strengths of said emulsified asphalt base and said color component are effective to maintain said color component as discrete globules dispersed in said asphalt emulsion.

85. A multi-color coating, including:

a water-based carrier including about 87 to about 97% by weight water and about 3% to about 10% by weight of a clay;

an emulsified asphalt base including about 5 to 50% by weight water, about 0.1 to about 5.0% by weight of a colloidal stabilizer, up to about 2% by weight of a thickener and about 10 to about 90% by weight of an asphalt; and at least one globular color component including about 5 to about 50% by weight of water, about 0.1 to about 5% by weight of a colloidal stabilizer, about 0.1 to about 2% by weight of a thickener and up to about 10% by weight of a pigment, wherein said color component has a viscosity and colloidal strength effective to prevent it from mixing with said emulsified asphalt base.

* * * * *